United States Patent [19]

Wesemann et al.

[11] Patent Number: 5,357,804
[45] Date of Patent: Oct. 25, 1994

[54] DEVICE INCLUDING A PLANAR MATRIX OF FLUID FILLED BAGS FOR MEASURING PRESSURE ACTING ON A SUPPORT

[76] Inventors: Rolf Wesemann, Stift 8, D-3320 Salzgitter 31; Are Ahrens, Im Winkel 6, D-3171 Hillerse; Ruediger Baretti, Kaiserstrasse 54, D-4830 Guetersloh, all of Fed. Rep. of Germany

[21] Appl. No.: 38,945
[22] Filed: Mar. 29, 1993
[51] Int. Cl.[5] .............................................. G01L 9/00
[52] U.S. Cl. ........................................ 73/705; 73/172; 73/731; 250/231.19
[58] Field of Search .................... 73/146.2, 146.3, 146, 73/731, 705, 172, 717, 756, 714; 250/231.19, 231.11, 227.21

[56] References Cited

U.S. PATENT DOCUMENTS

| | | | |
|---|---|---|---|
| 3,215,135 | 11/1965 | Franke | 73/705 X |
| 3,503,116 | 3/1970 | Strack | 73/705 X |
| 3,791,375 | 2/1974 | Pfeiffer | 73/172 X |
| 3,974,491 | 8/1976 | Sipe | 73/172 X |
| 4,149,285 | 4/1979 | Stanton | 5/453 |
| 4,158,310 | 6/1979 | Ho | 73/705 |
| 4,322,979 | 4/1982 | Fromm | 73/705 |
| 4,355,299 | 10/1982 | Cook, Jr. | 73/146.2 |
| 4,402,226 | 9/1983 | Perkins et al. | 73/708 |

FOREIGN PATENT DOCUMENTS

| | | |
|---|---|---|
| 882619 | 7/1953 | Fed. Rep. of Germany . |
| 2550718 | 5/1977 | Fed. Rep. of Germany . |
| 2904844 | 8/1980 | Fed. Rep. of Germany . |
| 3108147 | 1/1982 | Fed. Rep. of Germany . |
| 3625098 | 2/1987 | Fed. Rep. of Germany . |
| 937201 | 9/1963 | United Kingdom . |

OTHER PUBLICATIONS

Severin, et al., "A Simple Multimode Febre Interferometric Sensor For Pressure-Related Measurements" Philips Journal of Research, Bd. 43, No. 2, Jul. 1988, pp. 137-151.
Patent Abstracts of Japan, JP 4-2198851, vol. 14, No. 488, Oct., 1990, p. M-1039.
Patent Abstracts of Japan, JP 62-194432, vol. 12, No. 46, Feb., 1988, p. 665.

Primary Examiner—Richard E. Chilcot, Jr.
Assistant Examiner—Joseph L. Felber
Attorney, Agent, or Firm—Foley & Lardner

[57] ABSTRACT

To measure pressure acting on a support (1), a sealed bag (2) which is filled with a fluid and has flexible bag walls (9, 10), and which is arranged on the support (1) and whose interior communicates with a flexible capillary tube (4, 4'), is used as a sensor. Connected to the free end of the flexible capillary tube (4, 4') is an evaluation device which detects pressure variation, it being possible for the end of the flexible capillary tube (4, 4') to be plugged into a block (5). The block has a bore (6) which continues the channel of the flexible capillary tube (4, 4') and is sealed at its end not subjected to the flexible capillary tube (4, 4') by a diaphragm (7). The diaphragm bulges outwards in the event of a reduction in the volume of the bag (2). The extent of the outward bulging of the diaphragm (7) can be determined by an optical detector (15, 16).

11 Claims, 8 Drawing Sheets

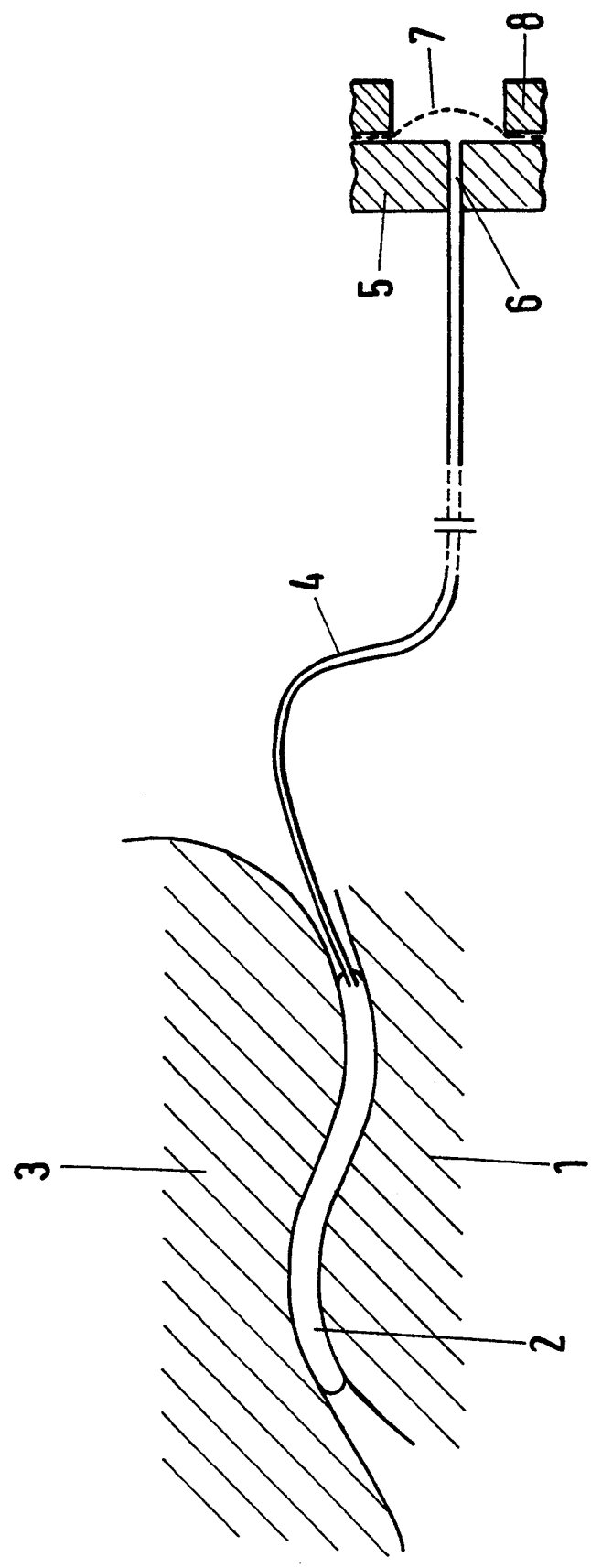

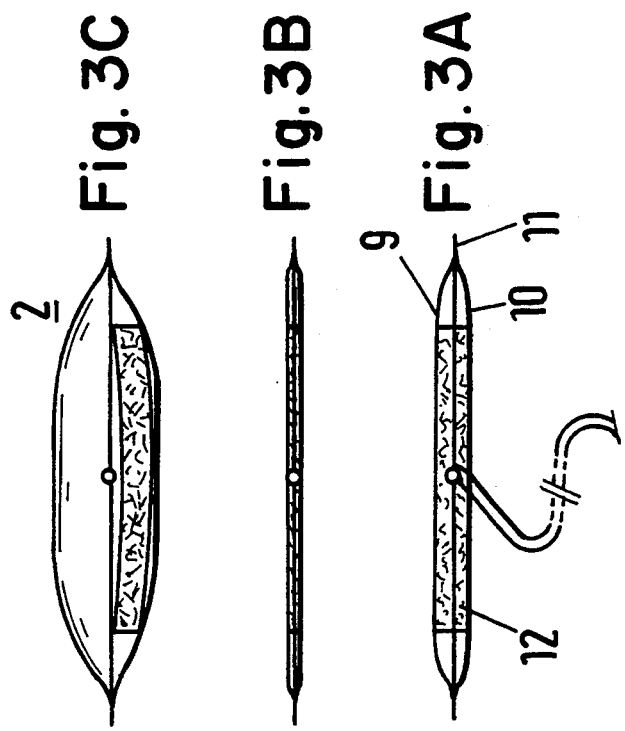
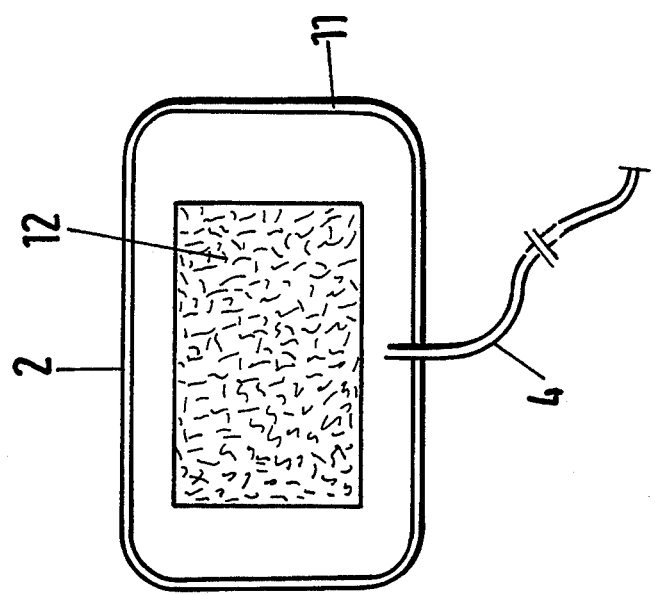

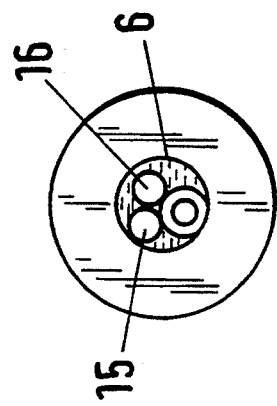
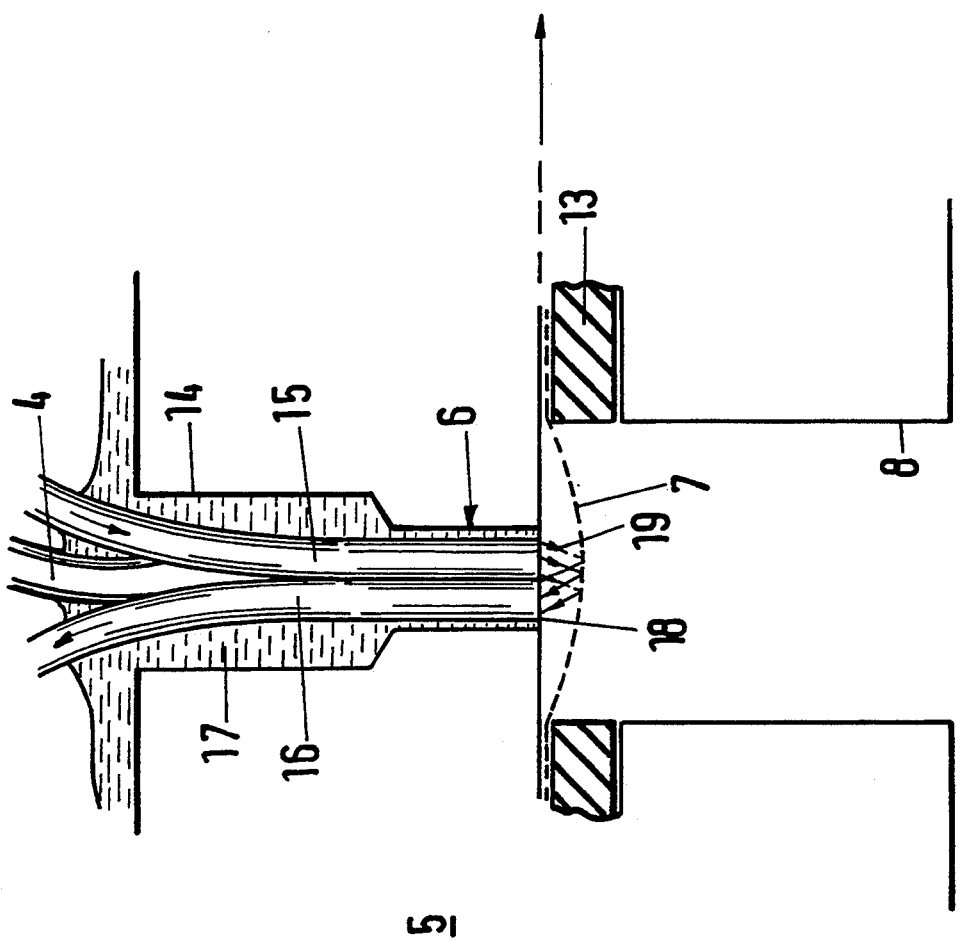

R= Reflector

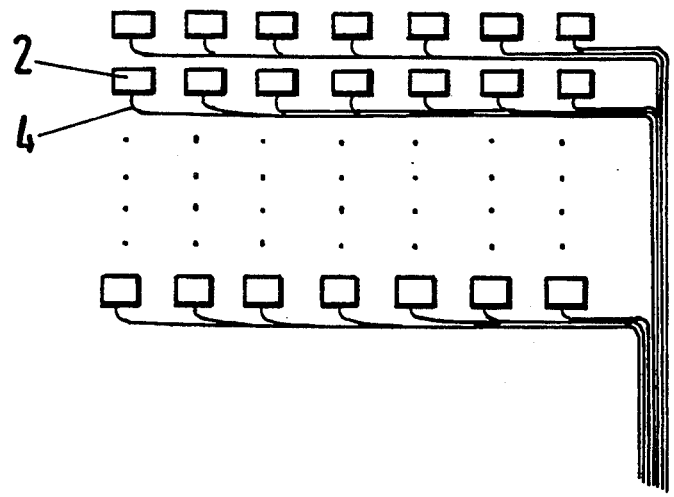
Fig.8
Fig.9
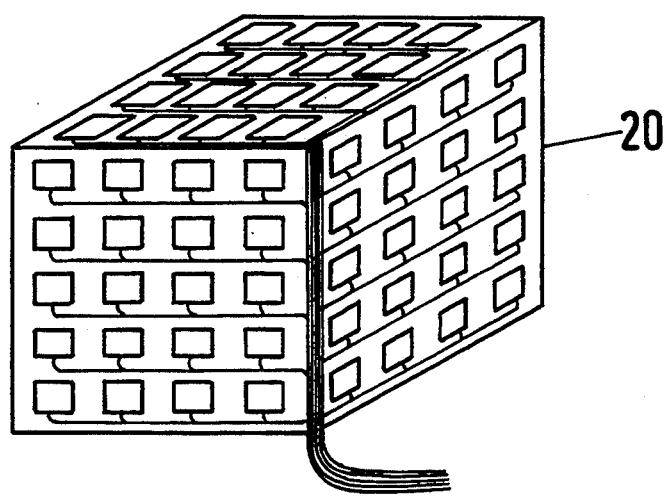

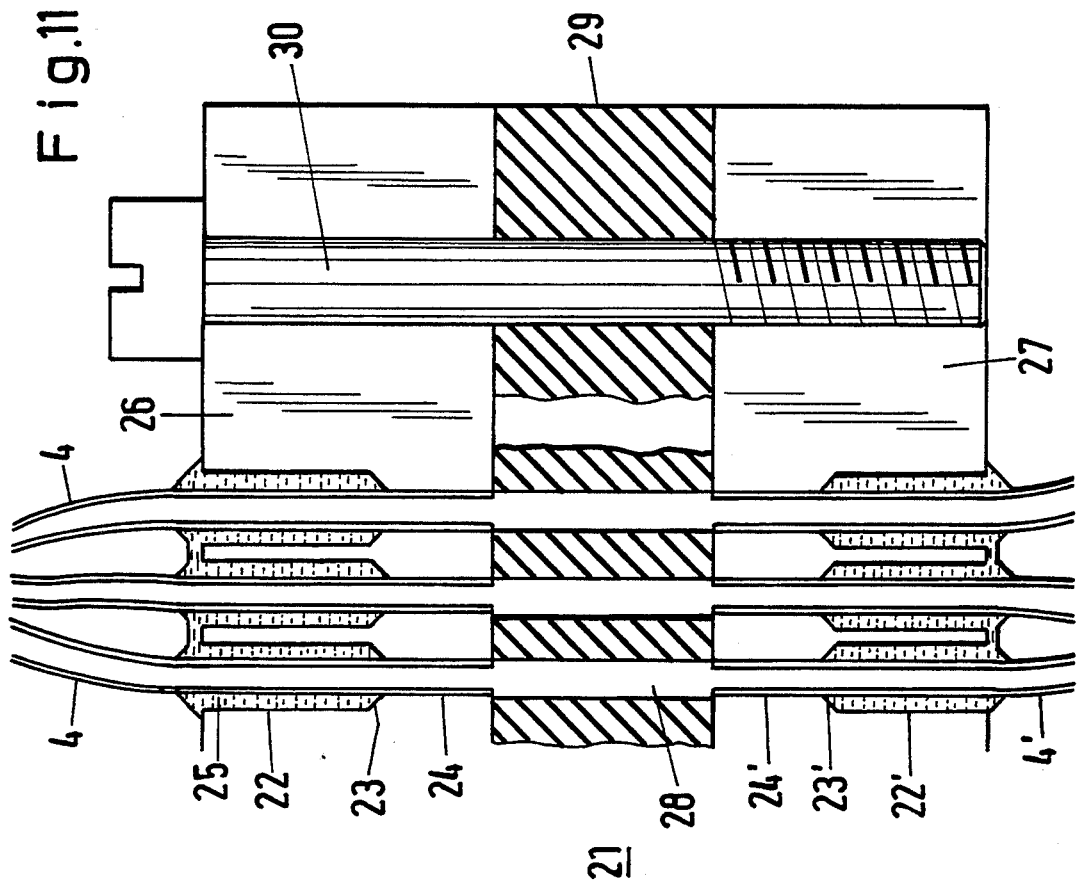
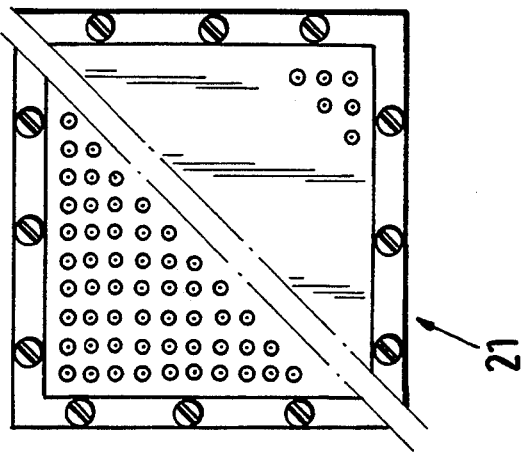

5,357,804

DEVICE INCLUDING A PLANAR MATRIX OF FLUID FILLED BAGS FOR MEASURING PRESSURE ACTING ON A SUPPORT

BACKGROUND OF THE INVENTION

The invention relates to a device for measuring pressure acting on a support, the device having at least one sealed bag filled with a fluid and having flexible bag walls to which there is connected a flexible capillary tube. The flexible capillary tube has a free end which is connected to an evaluation device which detects a pressure variation.

It is known to carry out pressure measurement using electronic sensors which convert a pressure exerted on the sensor into an electrical signal which, after amplification, if necessary, can be transmitted via electric lines to an evaluation device. Such sensors cannot be used in every case, since they have solid housings. Moreover, these sensors are relatively sensitive.

For example, it is not possible using the known sensors to measure the pressure exerted by a person on a sitting surface or lying surface, largely free of error over the entire surface, because the sensors have a disturbing effect on the pressure distribution because of their solid housings.

With particular regard to the measurement of high pressures, it is known from DE-C- 882,619 and from DE 2,550,718 A1 to deform a liquid-filled cushion or a liquid-filled box and to relay the increase in internal pressure thereby produced to a measuring instrument via a flexible capillary tube.

Such arrangements are clearly not suitable for measuring the pressure exerted by a person on a sitting surface or a lying surface.

It is known in principle from DE 3,625,098 A1 to measure the deformation of a diaphragm deformed by pressure in an optical fashion with the aid of two optical fibers. The optical fibers are arranged in this case on the side of the diaphragm not subjected to pressure.

SUMMARY OF THE INVENTION

It is an object of the present invention to provide a device for measuring the pressure exerted by a person on a sitting surface or a lying surface, wherein the measurement is largely free of error over the entire surface.

To achieve this object and in accordance with the purpose of the invention, as embodied and broadly described herein, a device for measuring pressure acting on a support comprises a sealed bag filled with a fluid and having flexible walls; a flexible capillary tube having one end connected to the sealed bag; and an evaluation device for detecting a pressure variation and connected to a second end of the capillary tube.

Broadly, the device of the present invention, a device for measuring pressure acting on a support, includes a plurality of sealed bags filled with a fluid and having flexible walls and arranged in the form of a planar matrix on the support; a plurality of flexible capillary tubes having first ends connected to the sealed bags, one flexible capillary tube being provided for each of the sealed bags; a plurality of evaluation devices, one evaluation device being provided for each of the flexible capillary tubes; a coupling block having insertion openings which have first ends respectively connected to second ends of the flexible capillary tubes; and a plurality of second flexible capillary tubes having first ends connected to second ends of the insertion openings and second ends connected to the evaluation devices.

The invention conveniently comprises evaluation devices which include a block having bores formed therein, the bores communicating respectively with the second capillary tubes; and a plurality of diaphragms, one diaphragm being provided for each of the sealed bags, the diaphragms bulging outwards when respective volumes of the sealed bags are reduced, the bores being sealed, at ends remote from the second capillary tubes, to the diaphragms.

Preferably, the pressure measuring device includes a plurality of optical detectors for detecting outward bulgings of the respective diaphragms.

Each optical detector advantageously includes a first optical fiber for directing light onto a respective diaphragm and a second optical fiber; and wherein the pressure measuring device further includes a light source for providing light to the first optical fibers and a light quantity detector connected to the second optical fibers.

Further objects and advantages of the invention will become apparent from the following detailed description taken in connection with the accompanying figures.

BRIEF DESCRIPTION OF THE DRAWINGS

The invention is explained in more detail below with the aid of exemplary embodiments represented in the drawing, wherein:

FIG. 1 shows a representation of the principle of the device according to the invention;

FIG. 2 shows a top view of a bag;

FIGS. 3 A–C show side views of the bag in accordance with FIG. 2, in three possible states;

FIG. 4 shows a diagrammatic representation of the arrangement of a block with a diaphragm;

FIG. 5 shows a top view of a part of the arrangement in accordance with FIG. 4;

FIG. 8 shows a diagrammatic representation of an arrangement of a multiplicity of bags on a planar support;

FIG. 9 shows a diagrammatic representation of a multiplicity of bags on the surfaces of a cube;

FIG. 10 shows a top view of a coupling block;

FIG. 11 shows a vertical section through the coupling block in accordance with FIG. 10;

DETAILED DESCRIPTION OF THE PREFERRED EMBODIMENTS

Figure 6:
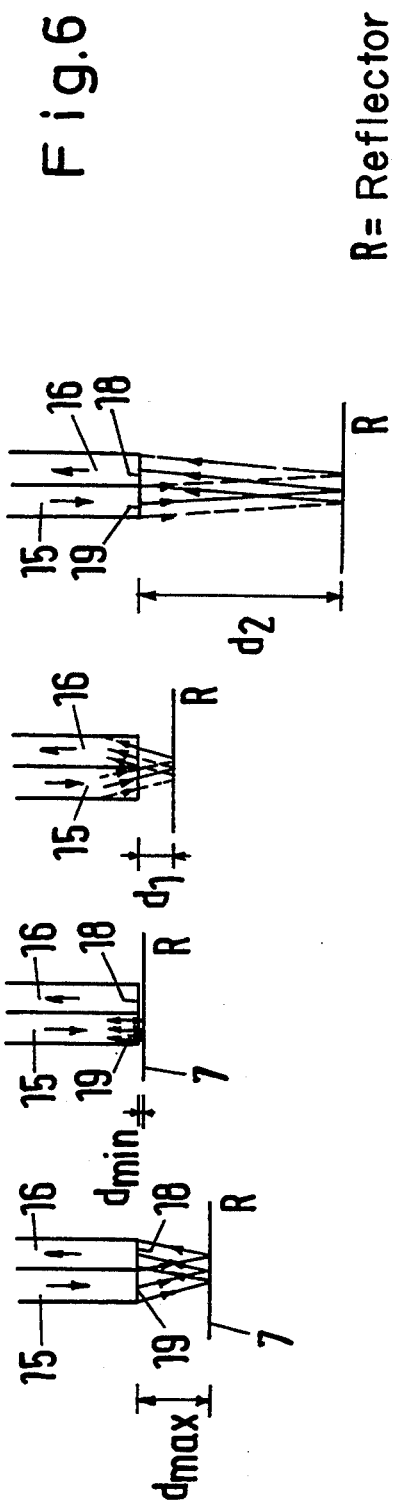
FIG. 6 shows a diagrammatic illustration of the measuring principle using two optical fibers.

According to the present invention, a device for measuring pressure acting on a support includes a multiplicity of bags arranged on the support to form a planar matrix, flexible capillary tubes that are guided jointly out of the measuring field and inserted in each case into an insertion opening of a coupling block, and evaluation devices that are connected to the other ends of the insertion openings.

The device according to the invention includes a planar matrix of bags which have only a slight size or spread in comparison with the support. The bags can be constructed to be very small, for example on the order of approximately 2 cm × 3 cm, so that a virtually punctiform or point-by-point measurement is possible for relatively large surfaces.

It is essential for the functioning of the device according to the invention that the flexible bag walls have virtually no or only a slight inherent elasticity, that is, the flexible bag walls develop virtually no restoring forces against a deformation. The pressure exerted on the bag is transmitted via the fluid to the end of the flexible capillary tube. If the fluid is a gas, for example air, the compressibility of the fluid is to be considered for the transmission. This consideration is eliminated if the fluid is a virtually incompressible liquid.

A particular advantage of the device according to the invention is that it can be constructed to be completely insensitive to the temperature of the measuring element. In the case of a relatively long transmission path from the measuring element, where the pressure is introduced, to the sensor, the transmission of temperature to the sensor is effectively prevented. This applies, in particular, for air-filled flexible tubes as the transmission medium and for bags made from plastic materials which are poor thermal conductors. Due to only partial filling of the bags, the pressure inside the bags is not dependent on temperature.

It is preferably possible to provide, for the purpose of detection, a block having a multiplicity of bores which communicate with the flexible capillary tubes and which are sealed at their ends remote from the respective flexible capillary tubes by diaphragms which bulge outwards in the event of a reduction in the volume of the bags. The outward bulging of the diaphragm, which can preferably be determined quantitatively by an optical detector, represents a measure of the reduction in the volume of the bag, that is, the increase in the pressure acting from outside on the bag.

In a simple embodiment, the optical detector is a first optical fiber directed onto the diaphragm and connected to a light source, and a second optical fiber connected to a light quantity detector. In this arrangement, the two optical fibers are directed parallel to one another onto the diaphragm and terminate with planar end faces directly in front of the diaphragm. In this case, the diaphragm is constructed in a lightreflecting fashion. It is possible with this arrangement to measure the distance of the diaphragm from the planar end faces of the two optical fibers. The distance of the diaphragm from the planar end faces of the optical fibers varies with the varying bulge of the diaphragm.

In a structurally advantageous embodiment, the optical fibers are inserted together with the associated flexible capillary tube into a bore in the block. The flexible capillary tube and the optical fibers thus form a triplet which is directed onto a side of the diaphragm which is damped in a sealing fashion. The detection of the bulge is therefore performed on that side of the diaphragm which is subjected to the flexible capillary tube.

A bag which is particularly suitable for the device according to the invention is constructed in a planar fashion and, in a simple embodiment, is formed from two planar bag walls connected to one another in a gas-tight fashion. Because the bag walls are not to have any inherent restoring forces, it is expedient if an elastically compressible insert which, in the unpressurized state, holds the bag walls at a distance from one another, is inserted into the bag. This ensures that the bag assumes a certain bulginess in the unpressurized state, and therefore has a defined starting position at assembly. The insert is preferably formed from a nonwoven web of synthetic fiber.

For applications in which the effect of the pressure on the support deforms the latter, it is expedient to measure, in addition to the magnitude of the pressure, the depth of deformation of the measurement surface. To the extent that the deformation has a vertical component, it can be measured by an additional bag, which is filled with liquid, protected against the effect of pressure, arranged on the support, and has flexible bag walls and a fluid-filled flexible tube. The bag is arranged above the block of the evaluation device. A water column is then produced above the evaluation device, the height of which depends on the instantaneous relative height of the bag. In the event of exertion of pressure on the surface, the pressure is kept away from the support, but the bag participates in the deformation of the support and changes its height, which can be detected by the change in the height of the water column which can be determined at the evaluation device.

The device according to the invention has particular advantages when a surface of a support to be measured is covered by a multiplicity of bags and the flexible capillary tubes of the bags are connected to a block with a corresponding multiplicity of bores and diaphragms.

It is expedient in this case to only have to connect the flexible capillary tubes to a coupling block for the purpose of assembly, starting from a side opposite the side where a connection to the block with the diaphragms is made by means of additional flexible capillary tubes. The connection between the coupling block and the block with the diaphragms can be permanently assembled in this case, so that it is also possible for the optical fibers to be permanently assembled on the block with the diaphragms. Measurement of another object therefore requires only a new arrangement and, possibly, assembly of the bags with the flexible capillary tubes on the coupling block.

The multiplicity of the optical signals transmitted via the second optical fibers can be detected according to the invention quickly and in a manner capable of evaluation by a computer because the second optical fibers terminate in a holder forming a matrix, and the matrix can be scanned by a video camera. This aspect of the invention thus permits the virtually simultaneous detection of a multiplicity of punctiform (point-by-point), optically represented measurement signals, because the punctiform optical measurement signals are arranged in the matrix and are scanned by the video camera. If a CCD (charge-coupled device) camera is used, a very fine gradation of intensity can be covered by assigning a multiplicity (for example, 16 × 16) of pixels to a punctiform measurement signal.

The invention permits for the first time a virtually non-reactive recording of the pressure distribution exerted by a person on a sitting or lying surface. For this purpose, the corresponding sitting or lying surface is covered with a multiplicity of bags which are, for example, inserted into a suitable textile holder.

FIG. 1 shows a support 1 on which a planar bag 2 is arranged. The support 1 is deformed by the pressure transmitted via a material layer 3. Since the bag 2 consists of flexible bag walls, it participates in the deformation without producing noticeable restoring forces.

Connected to the interior of the bag 2 is a flexible capillary tube 4 which terminates in a block 5. The block 5 is provided with a bore 6 which continues the channel of the flexible capillary tube 4. The bore is covered on the side not subjected to the flexible capillary tube 4 by a diaphragm 7 which is clamped to the block 5 in a sealing fashion by means of an annular mating holder 8.

The structure of the bag 2 can be seen from FIGS. 2 and 3. The bag 2 has in top view a rectangular plan and includes two planar foils as bag walls 9, 10 which are connected to one another circumferentially at their edges in a gas-tight fashion by means of a weld 11. The flexible capillary tube 4 is guided through the weld 11 on a longitudinal side. A rectangular insert 12 made from a nonwoven web of synthetic material is inserted into the interior of the bag 2.

The unpressurized normal position of the bag 2 is represented in FIG. 3A. The insert 12 serves as a spacer for the two bag walls 9, 10 on the basis of its normal thickness.

A pressure exerted on the bag 2 can compress the latter, as is shown in FIG. 3B. The compression takes place at most until the two bag walls 9, 10 are separated from one another only by the minimum thickness of the compressible insert 12.

FIG. 3C shows that the bag 2 can also bulge outwards to a greater extent. This can be caused by a reduced ambient pressure or by an increase in pressure in the sealed system of the bag 2 and flexible capillary tube 4, for example by an increase in temperature. The representation in FIG. 3C is exaggerated for reasons of clarity.

FIG. 4 shows a section through the block 5. The diaphragm 7 sealing the channel 6 is clamped against the block 5 by a highly flexible seal 13 and the annular mating holder 8. The channel 6 is situated at the end of an insertion opening 14 into which not only the end of the flexible capillary tube 4 but also the ends of a first optical fiber 15 and of a second optical fiber 16 are inserted. The insertion opening 14 merges via a constriction into the channel 6 in which the ends of the flexible capillary tube 4 and of the two optical fibers 15, 16 are inserted with a slight amount of play. The ends of the flexible capillary tube 4 and of the two optical fibers 15, 16 are fastened in the insertion opening 14 and the channel 6 by means of an adhesive 17 which is expediently black in order to avoid light losses.

As will be discussed in further detail below, the first optical fiber 15 is connected to a light source and the second optical fiber 16 is connected to a light measuring device. Light is transmitted from the first optical fiber 15 to the second optical fiber 16 by reflection at the diaphragm 7, the normal reflection factor of a rubber diaphragm being generally sufficient. However, for the purpose of an improved signal-to-noise ratio, it is expedient to provide the diaphragm 7 with a reflecting coating.

FIG. 5 illustrates the arrangement of the two optical fibers 15, 16 in the channel 6. It is expedient for the two optical fibers 15, 16 with planar end faces 18, 19 to seal in alignment with the wall of the block 5 against which the diaphragm 7 is clamped.

FIG. 6 illustrates the measuring principle of the optical distance measurement with the two optical fibers 15, 16. Represented in FIG. 6 is a minimum distance $d_{min}$ between the planar end faces 18, 19 of the optical fibers 16, 15 as well as a maximum distance $d_{max}$. It may be seen for the minimum distance $d_{min}$ that the light emerging from the optical fiber 15 is completely reflected by the diaphragm, which is seated virtually directly in front of the end face 19, so that virtually none of the emerging light is reflected into the end face 18 of the second optical fiber 16.

For a mean distance $d_1$, a portion of the light emerging from the first optical fiber 15 is reflected into the second optical fiber 16. The reflected light quantity is a maximum for the distance $d_{max}$ as shown in FIG. 6. For a distance $d_2$, situated far beyond the distance $d_{max}$, only a small proportion of the light emerging from the first optical fiber 15 will fall on the end face 18 of the second optical fiber 16.

Figure 7:
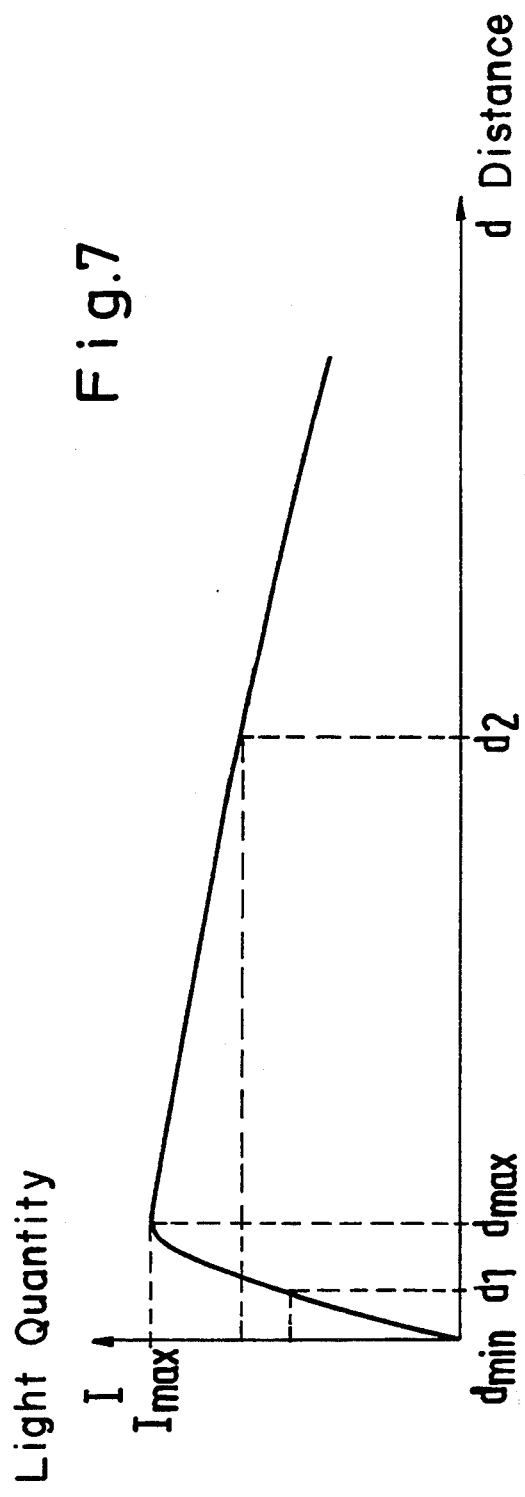
FIG. 7 shows a characteristic for the measuring principle represented in FIG. 6.

The different distances produce a characteristic as represented in FIG. 7. For the minimum distance $d_{min}$, the reflected light quantity is zero. Over the mean distance $d_1$, the reflected light quantity increases approximately linearly up to the maximum distance $d_{max}$. Thereafter, there is a continuous fall in the light quantity reflected and passing into the second optical fiber 16, and this is illustrated in FIG. 7 by the reflected light quantity for the distance $d_2$.

Only the area of the characteristic in FIG. 7 that is situated between the distances $d_{min}$ and $d_{max}$ is utilized for measuring the outward bulging of the diaphragm 7, that is, for measuring the distance of the diaphragm from the planar end faces 18, 19 of the optical fibers 16, 15.

Particular advantages are obtained when the arrangement according to the invention is applied with a multiplicity of bags 2, as indicated in FIG. 8. It is possible, for example, to use the arrangement represented in FIG. 8 to measure a sitting or lying surface of a chair, a mattress or a bed with respect to the pressure distribution exerted by a person. For this purpose, the bags 2 are distributed in the form of a planar matrix over the surface at uniform spacings. The associated flexible capillary tubes 4 are guided jointly out of the measuring field.

FIG. 9 illustrates that the surfaces of a spatial configuration, here a cube 20, can also be measured. Instead of the cube, it is also possible to conceive a pressure measurement on the surfaces of a vehicle body, in order to obtain information on the air pressure acting on the surface during movement of the vehicle.

FIGS. 10 and 11 show an advantageous device for manipulating the multiplicity of flexible capillary tubes 4 connected to the bags 2. The tubes are inserted into a coupling block 21 and arranged there also in the form of a matrix. The coupling block has a multiplicity of insertion openings 22 into which the ends of the flexible capillary tubes 4 are inserted. The ends of the flexible capillary tubes 4 pass via a tapered constriction 23 into a bore 24 which has a diameter equal to the outside diameter of the flexible capillary tube 4, or a bit smaller. It is ensured in this way that the flexible capillary tubes 4 are seated in a leakproof fashion in the bore 24. The flexible capillary tubes 4 are fixed in the insertion openings 22 by means of an adhesive 25, which fills in the insertion openings. The insertion opening 22 and bore 24 are constructed in a first plate 26. A similarly constructed mating plate 27 and a planar seal 29 which is provided with bores 28 corresponding to the bores 24, are also included in .the coupling block 21. The two plates 26, 27 are clamped to one another by means of screws 30, so that the planar seal 29 is pressed between the plates 26, 27 and the gas-proof and liquid-tight properties of the coupling block 21 are ensured. Inserted into the openings 22', 23', 24' are flexible connecting tubes 4' which correspond to the flexible capillary tubes 4 and produce the connection between the coupling block 21 and the block 5 on which diaphragms 7 are held.

Figure 12:
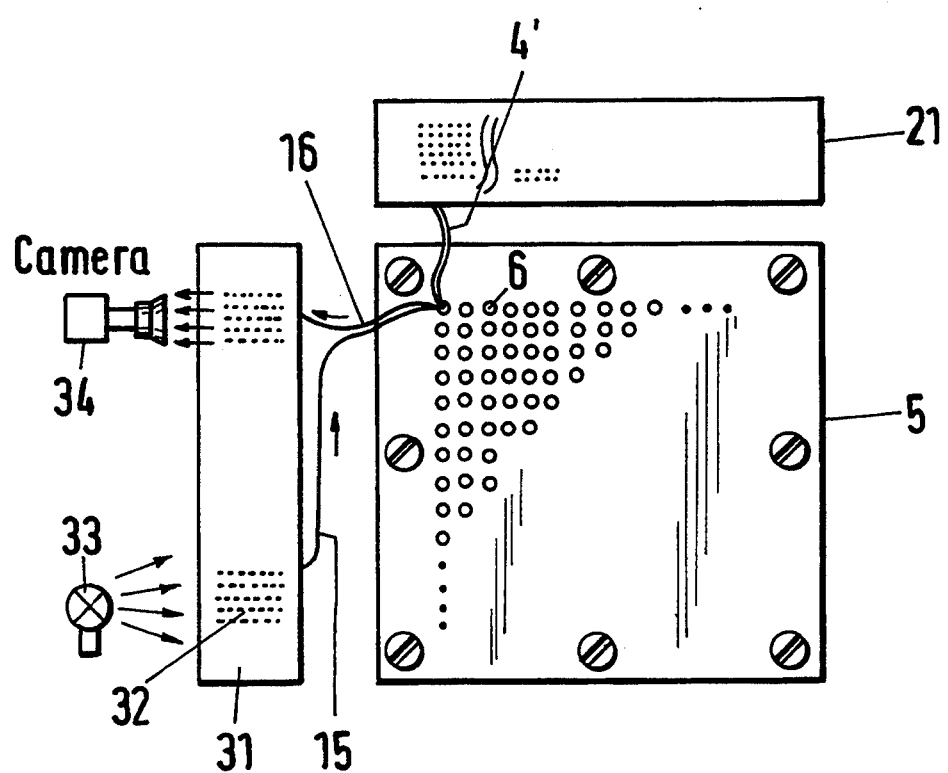
FIG. 12 shows a diagrammatic representation of the arrangement composed of the coupling block, measuring block and a block for the arrangement of the optical fibers in matrix form.

A diagrammatic representation of this connection may be seen in FIG. 12. Tubes 4' lead from the coupling block 21 to the individual channels 6 of the block 5. The channels 6 are sealed by the diaphragms on the rear side (not shown in FIG. 12). Inserted in each channel 6 is a first optical fiber 15 and a second optical fiber 16 in the arrangement described, in principle, with the aid of FIGS. 4 and 5. The other ends of the first optical fibers 15 are arranged to end in a plane in a holder 31 to form a rectangular matrix 32 with planar end faces, so that light from a light source 33 is fed uniformly into all the first optical fibers 15.

In a similar arrangement, the end faces of the second optical fibers end in the holder 31, likewise in a rectangular matrix 34. If a CCD camera having an arrangement of 720 × 580 pixels is used, 45 × 36 second optical fibers can be used, so that measuring points on the order of magnitude of 1600 are available for the surface to be measured.

By using 16 × 16 pixels for each measuring point, it is possible to discriminate brightness levels on the order of magnitude of 4000 for the measured values. The 1600 measuring points can be virtually simultaneously measured and evaluated by means of the camera 34.

Figure 13:
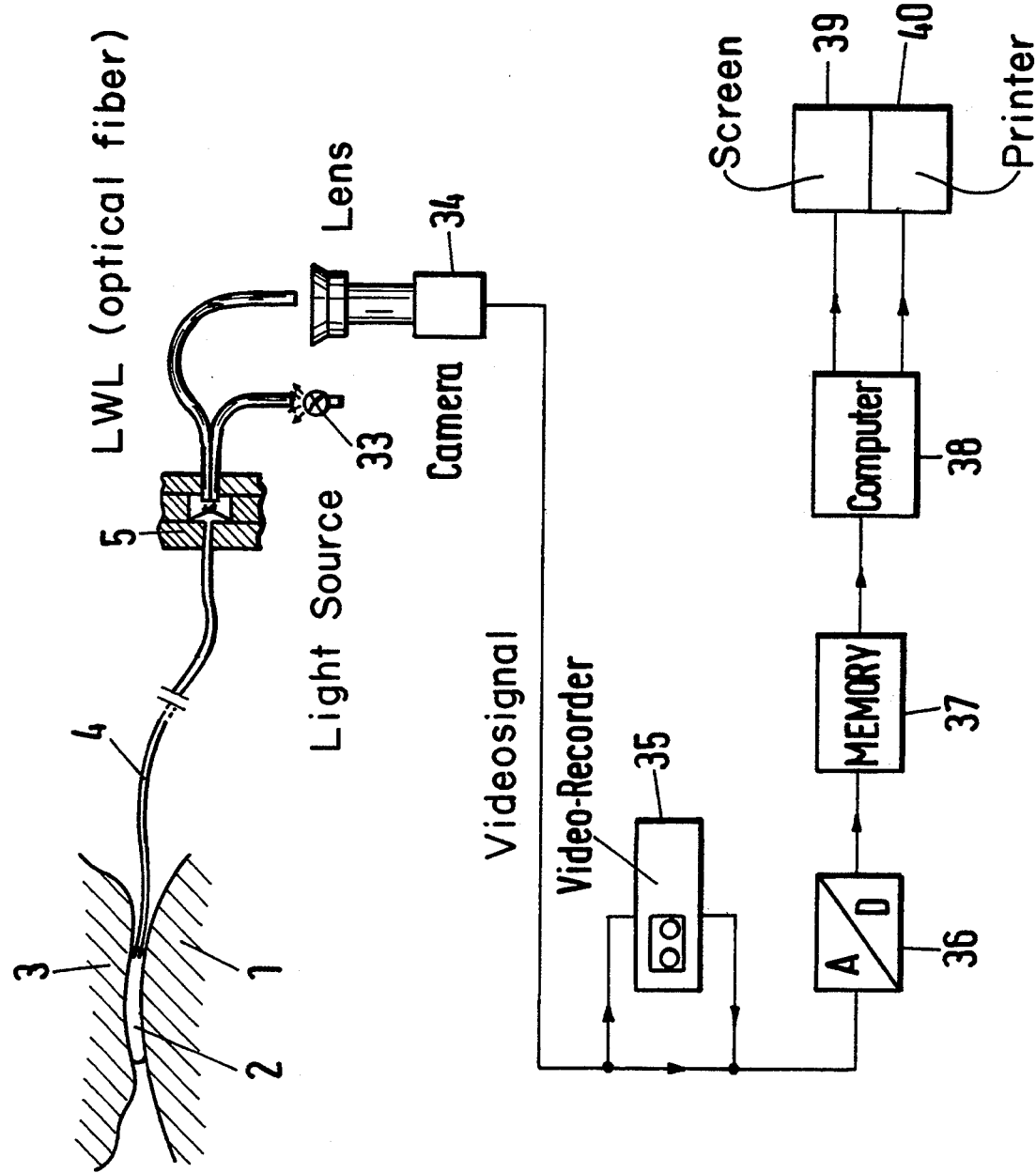
FIG. 13 shows a diagrammatic representation of evaluation possibilities for the measurement signals obtained using the arrangement according to the invention.

FIG. 13 illustrates the evaluation by means of the camera 34, the video signal of which can be buffered in a video recorder 35 as bulk storage. The video signal passes via an analog-to-digital converter 36 into an intermediate memory 37 and is evaluated by a computer 38 which can output the pressure distribution on a screen 39 and/or a printer 40. The evaluation represented by means of the camera 34 can thus be used to store and evaluate pressure distributions over a long time by means of a short scanning period.

While the invention has been shown and described in relation to certain preferred embodiments, numerous modifications and alterations to the disclosed embodiments are possible without departing from the spirit and scope of the invention, as defined by the appended claims and equivalents thereof.

What is claimed is:

1. A device for measuring pressure acting on a support, comprising:
   a plurality of sealed bags filled with a fluid and having flexible walls and arranged in the form of a planar matrix on said support so that said bags may be deformed by said pressure and said pressure transferred to the fluid in said bags;
   a plurality of first flexible capillary tubes having first ends connected to said sealed bags and communicating with the fluid in said sealed bags, and having second ends, one first flexible capillary tube being provided for each of said sealed bags;
   a plurality of evaluation devices, one evaluation device being provided for each of said first flexible capillary tubes;
   a coupling block having insertion openings which have first ends and second ends, said first ends of said insertion openings respectively connected to said second ends of said first flexible capillary tubes; and
   a plurality of second flexible capillary tubes having first ends connected to said second ends of said insertion openings and second ends connected to said evaluation devices.

2. The device of claim 1, wherein said evaluation devices comprises:
   a second block having bores formed therein, said bores communicating respectively with said second capillary tubes; and
   a plurality of diaphragms, one diaphragm being provided for each of said sealed bags, said diaphragms bulging outwards when respective volumes of said sealed bags are reduced, said bores being sealed, at ends remote from said second capillary tubes, to said diaphragms.

3. The device as claimed in claim 2, wherein each diaphragm is coated with a light-reflecting material.

4. The device of claim 2, further comprising a plurality of optical detectors for detecting the outward bulgings of respective diaphragms.
   a plurality of sealed bags filled with a fluid and having flexible walls and arranged in the form of a planar matrix on said support so that said bags may be deformed by said pressure and said pressure transferred to the fluid in said bags;
   a plurality of first flexible capillary tubes having first ends connected to said sealed bags and communicating with the fluid in said sealed bags, and having second ends, one first flexible capillary tube being provided for each of said sealed bags;
   a plurality of evaluation devices, one evaluation device being provided for each of said first flexible capillary tubes;
   a coupling block having insertion openings which have first ends and second ends, said first ends of said insertion openings respectively connected to said second ends of said first flexible capillary tubes; and
   a plurality of second flexible capillary tubes having first ends connected to said second ends of said insertion openings and second ends connected to said evaluation devices.

5. The device of claim 4, wherein said optical detectors each comprise a first optical fiber arranged so as to direct light onto a respective diaphragm and a second optical fiber arranged so as to receive light reflected from said diaphragm; and wherein a light source provides light to first optical fibers and a light quantity detector is connected to said optical fibers.

6. The device as claimed in claim 5, wherein each of said first and second optical fibers are directed parallel to one another onto a respective diaphragm and terminate with planar end faces directly in front of said respective diaphragm.

7. The device as claimed in claim 5, wherein each of said first and second optical fibers are inserted together with a respective second flexible capillary tube into respective bores in the second block.

8. The device as claimed in claim 5, further comprising a holder wherein the second optical fibers form with their ends a matrix which can be scanned by a video camera.

9. The device as claimed in claim 1, wherein each of said bags is formed from two planar bag walls connected to one another in a gas-tight fashion.

10. The device as claimed in claim 9, further comprising an elastically compressible insert for each of said bags, wherein when the bag is in an unpressurized state the insert holds the bag walls at a distance from one another.

11. The device as claimed in claim 10, wherein the insert is made of a nonwoven web of synthetic material.

* * * * *